Jan. 23, 1940. A. J. PENICK ET AL 2,187,839
CASING HEAD
Filed March 7, 1938
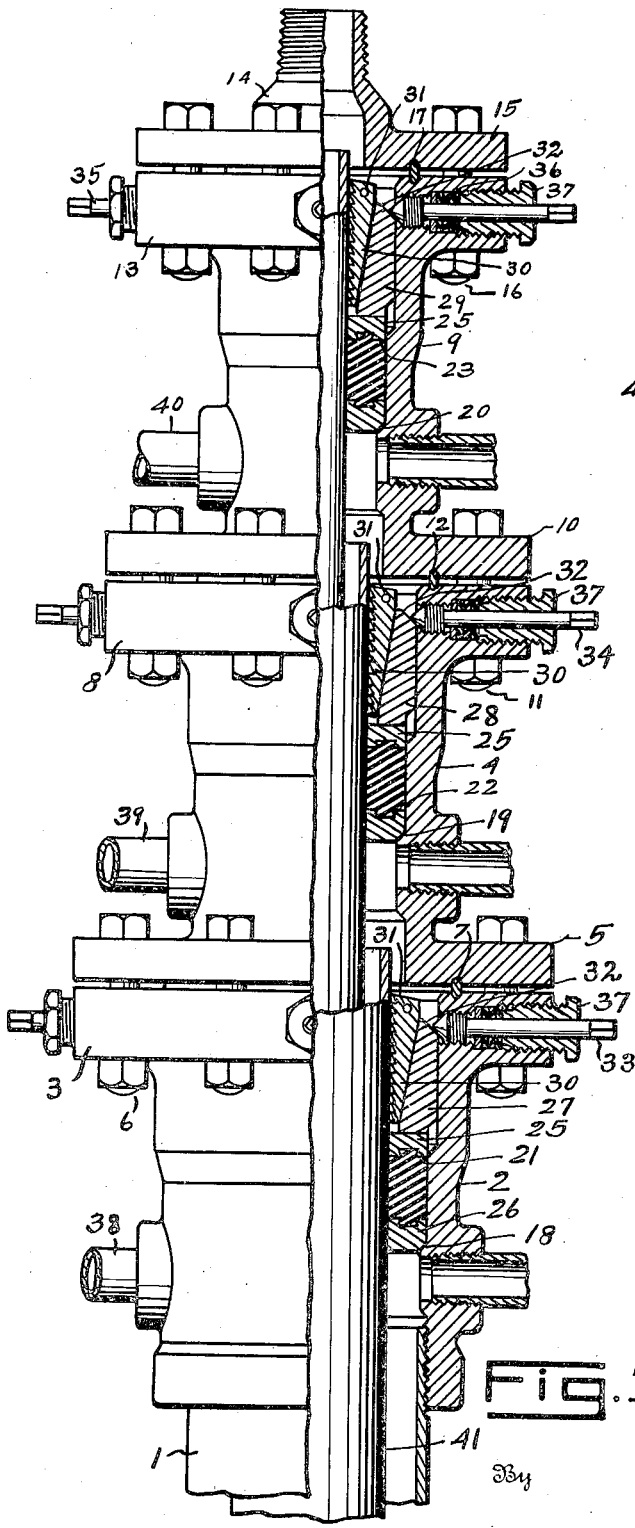
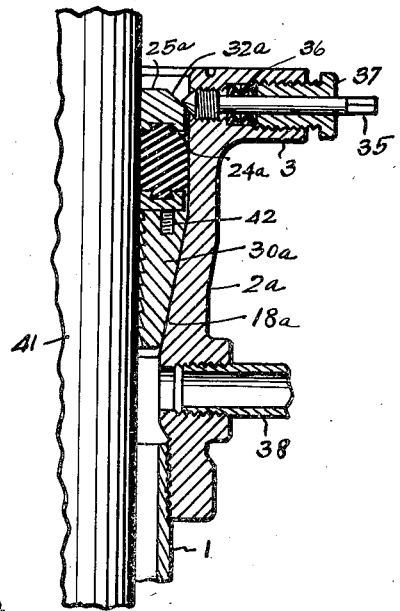
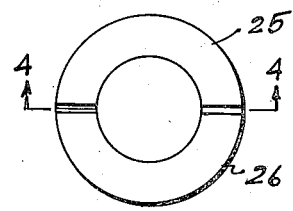
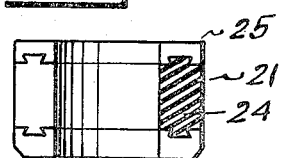

Patented Jan. 23, 1940

2,187,839

UNITED STATES PATENT OFFICE 2,187,839

CASING HEAD

Arthur J. Penick and Kirby T. Penick, Houston, Tex.

Application March 7, 1938, Serial No. 194,374

5 Claims. (Cl. 166—14)

This invention relates to a casing head.

An object of the invention is to provide a head for wells of the character described whereby one or more inside pipes may be supported, from their upper ends, in a well and fluid tight seals be maintained between the respective upper ends of the suspended pipes and the head members from which they are suspended.

It is another object of the invention to provide means whereby the weight of a suspended pipe may be supported by the sealing member to maintain an effective seal.

It is a further object of the invention to provide radially retractable means for applying a compressive force to each sealing member to effectively maintain a seal between the upper end of the suspended pipe and the corresponding head member, irrespective of the weight of the pipe thereon.

It is a further feature of the invention to provide pipe supporting and sealing means that may be readily assembled about the upper end of the suspended pipe in assembling the complete head on the well.

With the above and other objects in view the invention has particular relation to certain novel features of construction, operation and arrangement of parts, an example of which is given in this specification and illustrated in the accompanying drawing, wherein:

Figure 1 shows a side elevation of the assembled head, shown partly in section.

Figure 2 shows a fragmentary, vertical, sectional view of another embodiment.

Figure 3 shows a plan view of the sealing member, and

Figure 4 shows a vertical, sectional view taken on the line 4—4 of Figure 3.

Referring now more particularly to the drawing wherein like numerals of reference designate the same parts in each of the figures, the numeral 1 designates a well casing to the upper end of which a tubular head member 2 is attached and whose upper end has an external, annular flange 3. Mounted on the head member 2 is an intermediate tubular head member 4 whose lower end has an external, annular flange 5 which is secured, by the bolts 6, to the flange 3 with a suitable gasket 7 forming a fluid tight seal between said flanges. The upper end of the head member 4 has an external, annular flange 8 and above the head member 4 there is a tubular head member 9 having the external, annular flange 10 at its lower end which is bolted by the bolts 11 to the flange 8 with a gasket 12 forming a seal between the flanges 8, 10.

The upper end of the upper head member 9 has an external, annular flange 13 and on this flange is a tubular adapter 14 to support a Christmas tree or other flow connections. The adapter 14 has an external, annular flange 15 which is bolted to the flange 13 by means of the bolts 16 and there is a gasket 17 forming a fluid tight seal between the flanges 13, 15.

The head members 2, 4 and 9 have the respective inside seats 18, 19, 20 and above said seats are approximately cylindrical in inside contour to receive the correspondingly shaped, annular sealing rings 21, 22 and 23 which are supported on the corresponding seats and which are shaped to surround an inside pipe fitted through them.

These sealing rings are shown more accurately in Figures 3 and 4 and comprise an annular resilient packing 24, preferably formed of rubber and open at one end only and attached to the upper and lower ends of the packing are the upper and lower wear rings 25, 26, each formed of two arcuate sections as shown in Figure 3. The packing 24 being open at one side only will maintain the seal ring as a unit but will permit it to open and close, the material of the packing, opposite its open side forming a hinge for that purpose, each seal ring being shaped to fit closely within the head member for which it is adapted.

Each head member has its upper end internally enlarged, as shown, to receive the respective slip adapters 27, 28, 29 which are fitted into said enlarged upper ends and which rest on the corresponding upper wear rings 25. These adapters are internally flared upwardly forming seats to receive the wedge-shaped slips 30 which may be fitted into the respective adapters and which have inside teeth to engage the pipe to be held. These sets of slips are formed in sections in the usual manner and each slip is provided, at its upper end, with the transverse opening as 31 for the reception of a handle whereby the slips may be conveniently handled.

The upper end of each adapter has an outwardly and downwardly flared face 32 and extending radially through the respective flanges 3, 8 and 13 are the lockdown screws 33, 34, 35 whose inner ends have threaded connections with the corresponding head members and beyond said threads are conical shaped to bear bear against the corresponding faces 32 so that they may be screwed inwardly against said faces to force the adapters downwardly and to compress the sealing rings beneath. The lockdown screws may be retracted or screwed outwardly to release said adapters as is obvious. Each lockdown screw 35 is surrounded by a packing 36 maintained under compression, in the corresponding flange, by a gland 37 which surrounds the corresponding lockdown screw. The respective head members have the outlet pipes as 38, 39, 40 leading outwardly therefrom beneath the corresponding seal ring and which may be valve controlled in the usual way.

Any number of head members may be employed in the assembly if required by the circumstances. In the embodiment shown in Figure 2 each head member, for example, as 2a may have an inside, downwardly converging seat as 18a to receive the wedge-shaped slips as 30a which fit closely around and engage the inner pipe as 41. In this form the seal ring 24a is supported on the slips 30a around said inner pipe. This seal ring is substantially the same in construction as the type shown in Figures 3 and 4 except that the upper wear ring 25a has an external, downwardly and outwardly flared bearing face 32a against which the conical shaped inner end of the corresponding lockdown screw may engage to exert endwise compression on the seal ring beneath. Each slip 30a has a tapped hole 42 in its upper end into which a suitable handle may be screwed when it is desired to handle the slips in locating the same on, or removing the same from, the seat 18a.

With this type of head the inner pipe may be readily located in any desired position of elevation and readily anchored and a seal between it and the corresponding head member readily made and maintained.

In installing the equipment a blowout preventer may be mounted on the head member 2 and the larger inside pipe 41 lowered through the blowout preventer into the well and its lower end cemented. When the cement has set the blowout preventer may be removed and the pipe 41 pulled upwardly by equipment in the derrick provided for that purpose to place said pipe under tension. The seal ring 21 may be then inserted in the head member 2, the adapter 27 mounted thereon and the slips 30 seated in the adapter in engagement with the pipe. The upper end of said pipe 41 may then be cut off with a cutting torch at the desired place. The well may then be drilled deeper if desired and a smaller inside pipe as 42 lowered into the well to the desired depth and cemented therein as before. While lowering this pipe 42 the head member 4 is located on the head member 2 and a blowout preventer mounted thereon to prevent the escape of well pressure while the pipe 42 is being lowered and cemented. When the cement has set the blowout preventer may be removed and the pipe 42 may be placed under tension as before, the sealing ring 22 inserted into place and the slip adapter 28 and slips 30 inserted in position around the pipe 42 and the upper end of said pipe then cut off with a cutting torch, or otherwise, at the required elevation.

The flow tubing 43, with the screen thereon, if a screen be needed, is then lowered in a similar manner through the head member 9 and hung therein and the Christmas tree or other flow connections are installed in the usual way thus completing the work.

The drawing and description disclose what are now considered to be preferred forms of the invention by way of illustration only while the broad principle of the invention will be defined by the appended claims.

What we claim is:

1. In a casing head, a tubular head member having an inside seat and whose upper end is internally enlarged, an annular sealing member fitted closely within the head above the seat and resting on the seat and whose upper end extends upwardly into and is spaced from the wall of the enlarged portion of the head, said sealing member being shaped to surround an inner pipe, a slip adapter fitted closely into the enlarged upper portion of the head member and whose lower end is seated on the sealing means, slips in the adapter engageable with said inner pipe and effective to support the weight of the pipe on the sealing member beneath and radially movable locking means in the head member engageable with and releasable from the adapter.

2. In a casing head, a tubular head member having an inside seat and whose upper end is internally enlarged and of a larger inside diameter than the inside diameter of said member above the seat, an annular sealing means fitted closely within the head above the seat and resting on the seat and whose upper end extends up into the enlarged portion and is spaced inwardly from the inside wall of the enlarged portion of the head, said sealing means being shaped to surround an inner pipe, a slip adapter fitted closely into the internally enlarged upper portion of the head member and whose lower end is seated on the sealing means, pipe engaging slips in the adapter effective to support the weight of the pipe on the sealing means beneath and radially movable locking means in the head member engageable with and releasable from the upper end of the adapter.

3. In a casing head, a tubular head member having an inside seat and whose upper end is internally enlarged and of a larger inside diameter than the inside diameter of said member above the seat, an annular sealing means fitted closely within the head above the seat and resting on the seat and whose upper end extends up into the enlarged portion and is spaced inwardly from the inside wall of the enlarged portion of the head, said sealing means being shaped to surround an inner pipe, a slip adapter fitted closely into the internally enlarged upper portion of the head member and whose lower end is seated on the sealing means, pipe engaging slips in the adapter effective to support the weight of the pipe on the sealing means beneath, said head member having an external, annular flange and a radially movable locking device extended through the flange and having a threaded connection with the head member and engageable with and releasable from the adapter and sealing means in the flange around said locking device.

4. In a casing head, a tubular head member having inside upper and lower seats and whose upper end is internally enlarged above the upper seat and of a larger inside diameter above the upper seat than the inside diameter of said member above the lower seat, an annular sealing means fitted closely within the head above the lower seat and resting on said lower seat and whose upper end extends up above the upper seat into the enlarged portion and is spaced inwardly from the inside wall of the enlarged portion of the head, said sealing means being shaped to surround an inner pipe, a slip adapter fitted closely into the internally enlarged upper portion of the upper head member and whose lower end is seated on the sealing means, pipe engaging slips in the adapter effective to support the weight of the pipe on the sealing means beneath and means engageable with the adapter for locking the adapter against upward movement in the head member.

5. In a casing head, a tubular head member having inside upper and lower seats and whose upper end is internally enlarged above the upper seat and of a larger inside diameter above the upper seat than the inside diameter of said member above the lower seat, an annular sealing means fitted closely within the head above the lower seat and resting on said lower seat and whose upper end extends up above the upper seat into the enlarged portion and is spaced inwardly from the inside wall of the enlarged portion of the head, said sealing means being shaped to surround an inner pipe, a slip adapter fitted closely into the internally enlarged upper portion of the upper head member and whose lower end is seated on the sealing means, pipe engaging slips in the adapter effective to support the weight of the pipe on the sealing means beneath and means engageable with the adapter for locking the adapter against upward movement in the head member, said adapter having an external seat engageable with the upper seat of the head member upon the limit of the downward movement of the adapter.

ARTHUR J. PENICK.
KIRBY T. PENICK.